United States Patent
Paul et al.

(10) Patent No.: US 9,925,500 B2
(45) Date of Patent: Mar. 27, 2018

(54) MEMBRANE DERIVED FROM POLYFUNCTIONAL AMINE AND COMBINATION OF DIFFERENT POLYFUNCTIONAL AMINE-REACTIVE MONOMERS

(71) Applicant: Dow Global Technologies LLC, Midland, MI (US)

(72) Inventors: Mou Paul, Edina, MN (US); Tina L. Arrowood, Elko New Market, MN (US); Robert C. Cieslinski, Midland, MI (US); Steven D. Jons, Eden Prairie, MN (US); Steven Rosenberg, Shorewood, MN (US); Abhishek Roy, Edina, MN (US); Ian A. Tomlinson, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 443 days.

(21) Appl. No.: 14/407,013

(22) PCT Filed: Jul. 3, 2013

(86) PCT No.: PCT/US2013/049180
§ 371 (c)(1),
(2) Date: Dec. 10, 2014

(87) PCT Pub. No.: WO2014/014666
PCT Pub. Date: Jan. 23, 2014

(65) Prior Publication Data
US 2015/0174534 A1    Jun. 25, 2015

Related U.S. Application Data

(60) Provisional application No. 61/775,777, filed on Mar. 11, 2013, provisional application No. 61/775,814, filed on Mar. 11, 2013, provisional application No. 61/675,412, filed on Jul. 25, 2012, provisional application No. 61/674,634, filed on Jul. 23, 2012, provisional application No. 61/673,453, filed on Jul. 19, 2012, provisional application No. 61/673,456, filed on Jul. 19, 2012, provisional application No. 61/673,462, filed on Jul. 19, 2012, provisional application No. 61/673,466, filed on Jul. 19, 2012, provisional application No. 61/673,467, filed on Jul. 19, 2012.

(51) Int. Cl.
*B01D 67/00* (2006.01)
*B01D 69/12* (2006.01)
*B01D 71/56* (2006.01)
*B01D 61/02* (2006.01)
*B01D 69/10* (2006.01)

(52) U.S. Cl.
CPC ....... *B01D 67/0006* (2013.01); *B01D 61/025* (2013.01); *B01D 67/0002* (2013.01); *B01D 69/10* (2013.01); *B01D 69/12* (2013.01); *B01D 69/125* (2013.01); *B01D 71/56* (2013.01); *B01D 2323/00* (2013.01); *B01D 2323/38* (2013.01); *B01D 2323/40* (2013.01); *B01D 2325/20* (2013.01)

(58) Field of Classification Search
CPC .................................................. B01D 69/125
See application file for complete search history.

(56) References Cited

U.S. PATENT DOCUMENTS

| | | |
|---|---|---|
| 3,304,310 A | 2/1967 | Hari et al. |
| 3,686,116 A | 8/1972 | Rio |
| 3,694,390 A | 9/1972 | Winslow |
| 3,878,109 A | 4/1975 | Ikeda et al. |
| 4,259,183 A | 3/1981 | Cadotte |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |

(Continued)

FOREIGN PATENT DOCUMENTS

| | | |
|---|---|---|
| CN | 1035338 | 9/1989 |
| CN | 1935338 | 3/2007 |

(Continued)

OTHER PUBLICATIONS

Machine Translation of CN102219673A.*
Li et al, Polyamide thin film composite membranes prepared from isomeric biphenyl tetraacyl chloride and m—phenylenediamine, Journal of Membrane Science 315, (2008) 20-27.
Petersen, composite reverse osmosis and nanofiltration membranes, Journal of Membrane Science 83, (1993) 81-150.

(Continued)

*Primary Examiner* — Alex A Rolland
(74) *Attorney, Agent, or Firm* — Edward W. Black

(57) ABSTRACT

A method for making a composite polyamide membrane including a porous support and a thin film polyamide layer including the steps of applying a polyfunctional amine monomer and a combination amine-reactive compounds to a surface of the porous support and reacting the constituents to form a thin film polyamide layer, wherein the amine-reactive compounds include: i) a polyfunctional amine-reactive monomer including two to three amine-reactive moieties selected from acyl halide, sulfonyl halide and anhydride, ii) a polyfunctional amine-reactive monomer including at least four amine-reactive moieties selected from acyl halide, sulfonyl halide and anhydride, and iii) an acid compound including at least on carboxylic acid moiety or salt thereof and at least one amine-reactive moiety selected from acyl halide and sulfonyl halide.

7 Claims, No Drawings

(56) References Cited

U.S. PATENT DOCUMENTS

| | | |
|---|---|---|
| 4,719,062 A | 1/1988 | Sundet |
| 4,758,343 A | 7/1988 | Sasaki et al. |
| 4,761,234 A | 8/1988 | Uemura et al. |
| 4,769,148 A | 9/1988 | Fibiger et al. |
| 4,783,346 A | 11/1988 | Sundet |
| 4,812,270 A | 3/1989 | Cadotte et al. |
| 4,830,885 A | 5/1989 | Tran et al. |
| 4,872,984 A | 10/1989 | Tomaschke |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |
| 5,015,380 A | 5/1991 | Sundet |
| 5,015,382 A | 5/1991 | Sundet |
| 5,019,264 A | 5/1991 | Arthur |
| 5,049,282 A | 9/1991 | Linder et al. |
| 5,051,178 A | 9/1991 | Uemura et al. |
| 5,160,619 A | 11/1992 | Yamaguchi et al. |
| 5,180,802 A | 1/1993 | Hartman et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,245,234 B1 | 6/2001 | Koo et al. |
| 6,280,853 B1 | 8/2001 | Mickols |
| 6,337,018 B1 | 1/2002 | Mickols |
| 6,406,626 B1 | 6/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,777,488 B1 | 8/2004 | Araki et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 8,147,735 B2 | 4/2012 | Buschmann |
| 8,177,978 B2 | 5/2012 | Kurth et al. |
| 2010/0006495 A1* | 1/2010 | Buschmann ....... B01D 67/0006 210/500.25 |
| 2010/0062156 A1* | 3/2010 | Kurth ............... B01D 61/002 427/243 |
| 2011/0049055 A1 | 3/2011 | Wang et al. |
| 2012/0248027 A1 | 10/2012 | Sasaki et al. |
| 2012/0261332 A1 | 10/2012 | Takagi et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2013/0287944 A1 | 10/2013 | Paul et al. |
| 2013/0287945 A1 | 10/2013 | Roy et al. |
| 2013/0287946 A1 | 10/2013 | Jons et al. |
| 2014/0170314 A1 | 6/2014 | Zhang et al. |
| 2014/0199483 A1 | 7/2014 | Roy et al. |
| 2014/0206900 A1 | 7/2014 | Qiu et al. |
| 2014/0272134 A1 | 9/2014 | Roy et al. |
| 2014/0295078 A1 | 10/2014 | Paul et al. |
| 2014/0370191 A1 | 12/2014 | Rosenberg et al. |

FOREIGN PATENT DOCUMENTS

| | | |
|---|---|---|
| CN | 101601975 A | 12/2009 |
| CN | 102219673 A * | 10/2011 |
| CN | 102219673 | 7/2014 |
| EP | 0556569 | 11/1993 |
| JP | 53146275 | 12/1978 |
| WO | 2010120326 | 10/2010 |
| WO | 2011152735 | 12/2011 |
| WO | 2013048762 | 4/2013 |
| WO | 2013048763 | 4/2013 |
| WO | 2013103666 | 7/2013 |
| WO | 2014014662 | 1/2014 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |
| WO | 2014109946 | 7/2014 |
| WO | 2014109947 | 7/2014 |
| WO | 2014179024 | 11/2014 |

* cited by examiner

MEMBRANE DERIVED FROM POLYFUNCTIONAL AMINE AND COMBINATION OF DIFFERENT POLYFUNCTIONAL AMINE-REACTIVE MONOMERS

FIELD

The present invention is directed toward thin film composite membranes along with methods for making and using the same.

INTRODUCTION

Composite polyamide membranes are used in a variety of fluid separations. One class includes a porous support with a "thin film" polyamide layer. These membranes are commonly referred to as "thin film composite" (TFC) membranes. The thin film polyamide layer may be formed by an interfacial polycondensation reaction between polyfunctional amine (e.g. m-phenylenediamine) and polyfunctional amine-reactive (e.g. trimesoyl chloride) monomers which are sequentially coated upon the support from immiscible solutions, see for example U.S. Pat. No. 4,277,344 to Cadotte. Various other polyfunctional amine-reactive monomers have been studied. For example, U.S. Pat. No. 4,259,183 to Cadotte describes combinations of bi- and tri-functional acyl halide monomers, e.g. isophthaloyl chloride or terephthaloyl chloride with trimesoyl chloride. WO 2010/120326 describes the use of trimesoyl chloride in combination with its mono and di-hydrolyzed counterparts. Tetraacyl halide monomers have also been described in the literature, see for example: i) Lei, Li et al., Polyamide Thin Film Composite Membranes Prepared from Isomeric Biphenyl Tetraacyl Chloride and m-Phenylene diamine, Journal of Membrane Science, 315 (2008), pg 20-27; ii) R. J. Peterson, Composite Reverse Osmosis and Nanofiltration Membranes, Journal of Membrane Science, 83 (1993), pp. 81-150 (see for example pg. 116-117) and U.S. Pat. No. 6,162,358, both of which describe the use of adamantane-2,6 dione-1,3,5,7 tetra carbonyl chloride, and iii) CN 102219673 which describes the formation of nano filtration membranes using combinations of 5,5'-methylene diisophthaloyldichloride, trimesoyl chloride and piperazine. Additional constituents have also been added to the coating solution to improve membrane performance. For example, U.S. Pat. No. 6,878,278 to Mickols describes the addition of a tri-hydrocarbyl phosphate compound to the acyl halide coating solution.

The incorporation of carboxylic acid moieties into the polyamide layer imparts the layer with a more negative charge and this is believed to improve the rejection of certain solutes (e.g. silica) along with providing the membrane with improved resistance to certain foulants (e.g. humic acid). A portion of acyl halide groups of s polyfunctional acyl halide monomer such as TMC inevitably become hydrolyzed during or after the interfacial polymerization (e.g. via reaction with water present in the atmosphere or with water present in the amine coating solution). The overall carboxylic acid content of the polyamide layer can be further increased by utilizing amine-reactive monomers possessing carboxylic acid moieties. See for example WO 2010/120326 (see also U.S. Pat. No. 8,177,978). Unfortunately, the degree of incorporation of such carboxylic acid containing monomers has limits. WO 2010/120326 demonstrates an upper limit of 0.02125 wt % of mono hydrolyzed trimesoyl chloride, beyond which the polyamide structure looses integrity, (i.e. note catastrophic loss of salt rejection shown in FIG. 14 of WO 2010/120326).

SUMMARY

The present invention includes composite polyamide membranes and methods for making and using the same. In one embodiment, the invention includes a method for making a composite polyamide membrane including a porous support and a thin film polyamide layer including the steps of applying a polyfunctional amine monomer and a combination amine-reactive compounds to a surface of the porous support and reacting the constituents to form a thin film polyamide layer, wherein the amine-reactive compounds include:

i) a polyfunctional amine-reactive monomer including two to three amine-reactive moieties selected from acyl halide, sulfonyl halide and anhydride, ii) a polyfunctional amine-reactive monomer including at least four amine-reactive moieties selected from acyl halide, sulfonyl halide and anhydride, and iii) an acid compound including at least on carboxylic acid moiety or salt thereof and at least one amine-reactive moiety selected from acyl halide and sulfonyl halide.

Many additional embodiments are described.

DETAILED DESCRIPTION

The invention is not particularly limited to a specific construction or shape of composite membrane. For example, the present invention is applicable to flat sheet, tubular and hollow fiber polyamide membranes generally useful in reverse osmosis (RO). RO membranes are relatively impermeable to virtually all dissolved salts and typically reject more than about 95% (preferably greater than 96.5%, 99% and even 99.5%) of salts having monovalent ions such as sodium chloride. RO membranes also typically reject more than about 95% of inorganic molecules as well as organic molecules with molecular weights greater than approximately 100 Daltons.

In one embodiment, the invention includes a standard flat sheet construction comprising a bottom layer (back side) of a nonwoven backing web (e.g. PET scrim), a middle layer of a porous support having a typical thickness of about 25-125 μm and top layer (front side) comprising a thin film polyamide layer having a thickness preferably less than about 1 micron, e.g. from 0.01 micron to 1 micron but more preferably from about 0.01 to 0.1 μm. The porous support is preferably a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO applications, the porous support provides strength but offers little resistance to fluid flow due to its relatively high porosity. Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional amine-reactive monomer upon the surface of the porous support as generally described in U.S. Pat. No. 4,277,344 and U.S. Pat. No. 6,878,278. More specifically, the polyamide membrane layer may be prepared by interfacially polymerizing a polyfunctional amine monomer with a polyfunctional amine-reactive monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional amine-reactive monomers are most commonly applied to the porous support by way of a coating step from solution, wherein the polyfunctional amine monomer is typically coated from an aqueous-based or polar solution and the polyfunctional amine-reactive monomers from an organic-based or non-polar solution. Although the coating steps need not follow a specific order, the polyfunctional amine monomer is preferably first coated on the porous support followed by the polyfunctional amine-reactive monomer. Coating can be accomplished by spraying, film coating, rolling, or through the use of a dip tank among other coating techniques. Excess solution may be removed from the support by air knife, dryers, ovens and the like. Once brought into contact with one another, the acyl halide and polyfunctional amine monomers react at their surface interface to form a polyamide layer. This layer, often referred to as a polyamide "discriminating layer" or "thin film" layer, provides the composite membrane with its principal means for separating solute (e.g. salts) from solvent (e.g. aqueous feed). The reaction time of the polyfunctional amine-reactive and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

The polyfunctional amine monomer is not particularly limited and representative examples include at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Preferred examples include polyfunctional amine monomers including two or three primary amino groups. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 8 weight percent polyfunctional amine monomer. Once coated on the porous support, excess solution may be optionally removed.

In one embodiment, the present invention includes applying a combination of at least two different polyfunctional amine-reactive monomers along with a distinct acid compound to the porous support. The individual constituents may be coated separately, e.g. sequentially, but are preferably combined and coated from a common non-polar solution. The constituents may be dissolved in a non-polar solvent in a range from about 0.01 to 10 weight percent, preferably 0.05 to 4 weight percent (when combined) and may be delivered as part of a continuous or batch coating operation. The selection of non-polar solvent is not particularly limited and combinations of multiple solvents may be used. The solvent is preferably a liquid at 20° C. (101 kPa). The solvent preferably has a water solubility of less than 800 ppm (and more preferably less than 500, 400, 300, or 200, or in some embodiments, less than 150 ppm). As used herein, the term "water solubility" refers to the concentration of water that is soluble in a chosen hydrocarbon solvent measured at 20° C. (101 kPa) as measured by ASTM D4928-11. Non-limiting examples of applicable solvents include: paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include from 1 to 40, 2 to 20, or 3 to 15 weight percent of aromatic content such as 1,3,5-trimethyl benzene. Other preferred solutions include over 50 weight percent of a paraffin or isoparaffin such as ISOPAR™ L. Still other embodiments meet both the preceding criteria.

Representative polyfunctional amine-reactive compounds are not particularly limited and may be aromatic or aliphatic (straight chain or cyclic), and may be used alone or in combination. Non-limiting examples of aromatic polyfunctional amine-reactive monomers including two to three acyl halide moieties include: trimesic acid chloride, terephthalic acid chloride, isophthalic acid chloride, biphenyl dicarboxylic acid chloride, naphthalene dicarboxylic acid dichloride, pyridine-3,5-dicarbonyl dichloride, and pyridine-2,6-dicarbonyl dichloride. Non-limiting examples of alicyclic polyfunctional acyl halides include: cyclopropane tri carboxylic acid chloride, cyclopentane tri carboxylic acid chloride, cyclohexane tri carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. Non-limiting examples of aliphatics include adipoyl chloride, malonyl chloride, glutaryl chloride, and sebacoyl chloride. One particularly preferred polyfunctional amine-reactive monomer is trimesoyl chloride (TMC). One or more of the acyl halide moieties in the aforementioned compounds may be replaced with a sulfonyl halide or anhydride moieties. Representative examples include: 3-(chlorosulfonyl)benzoic hypochlorous anhydride; 3,5-bis(chlorosulfonyl)benzoic hypochlorous anhydride; 1,3-dioxo-1,3-diydroisobenzofuran-5-sulfonyl chloride; and 1,3-dioxo-1,3-diydroisobenzofuran-5-carbonyl chloride.

The polyfunctional amine-reactive monomer comprising at least four amine-reactive moieties may be a tetraacyl halide monomer including adamantane-2,6-dione-1,3,5,7-tetracarbonyl chloride, 1,2,4,5-benzene tetra carboxylic acid chloride, and naphthalene-tetracarbonyl tetrachlorides. A preferred class of such monomers is represented by Formula (I):

Formula (I)

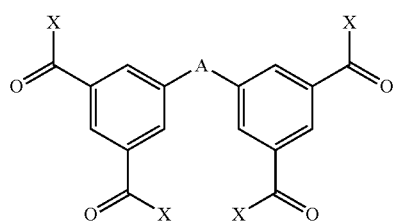

wherein A is selected from oxygen: (—O—); carbon (—C—); silicon (—Si—); each which may be unsubstituted or substituted, e.g. with alkyl groups of 1-4 carbon atoms; or a carbonyl group (—C(O)—), and X is the same or different and is selected from a halogen, preferably chlorine. In a preferred embodiment, A is an unsubstituted carbon, e.g. 5,5'-methylene diisophthaloyl dichloride. One or more of the acyl halide moieties in the aforementioned compounds may be replaced with a sulfonyl halide or anhydride moieties. Representative examples include 3-(chlorosulfonyl)benzoyl chloride, 3,5-bis(chlorosulfonyl)benzoyl chloride, 1,3-dioxo-1,3-dihydroisobenzofuran-5-carbonyl chloride, 1,3-dioxo-1,3-dihydroisobenzofuran-5-sulfonyl chloride, benzo[1,2-c:4,5-c']difuran-1,3,5,7-tetraone, and 5-(chlorosulfonyl)isophaloyl dichloride. The selection of acid compounds is not particularly limited but all include: (a) at least one carboxylic acid moiety or salt thereof and (b) at least one acyl halide or anhydride moiety. In a preferred embodiment, the acid compound is distinct from the aforementioned polyfunctional amine-reactive monomers. Non-limiting examples include mono and di-hydrolyzed counterparts of the aforementioned polyfunctional amine-reactive monomers that include two to three acyl halide groups and mono, di and tri-hydrolyzed counterparts of the polyfunctional halide monomers that include at least four amine-reactive moieties. Preferred acid compounds include the mono-hydrolyzed trimesoyl chloride (mhTMC) and the mono-hydrolyzed isophthaloyl chloride (mhIPC). Additional examples include that represented by Formula (II):

Formula (II)

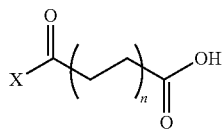

wherein X is a halogen (preferably chlorine) and n is an integer from 1 to 10. Representative species include: 4-(chlorocarbonyl) butanoic acid; 5-(chlorocarbonyl) pentanoic acid; 6-(chlorocarbonyl) hexanoic acid; 7-(chlorocarbonyl) heptanoic acid; 8-(chlorocarbonyl) octanoic acid; 9-(chlorocarbonyl) nonanoic acid and 10-(chlorocarbonyl) decanoic acid. While the acyl halide and carboxylic acid groups are shown in terminal positions, one or both may be located at alternative positions along the aliphatic chain. While not shown in Formula (II), the aliphatic reactant may include additional carboxylic acid and acyl halide groups. Additionally, corresponding aromatic species may used including 3-carboxybenzoyl chloride and 4-carboxybenzoyl chloride.

Representative examples of acid compounds include at least one anhydride group and at least one carboxylic acid groups include: 3,5-bis(((butoxycarbonyl)oxy)carbonyl) benzoic acid, 1,3-dioxo-1,3-dihydroisobenzofuran-5-carboxylic acid, 3-(((butoxycarbonyl)oxy)carbonyl)benzoic acid, and 4-(((butoxycarbonyl)oxy)carbonyl)benzoic acid.

The non-polar coating solution preferably includes at least 0.1, 0.2. 0.3, 0.4 or 0.5 wt % of the polyfunctional amine-reactive monomer including two to three amine-reactive moieties. A preferred range is from 0.1 to 0.3 wt %.

The non-polar coating solution preferably includes at least 0.01, 0.025, 0.04, 0.05 and even 0.6 wt % of the acid compound. A preferred range is from 0.02 to 0.6 wt %.

The non-polar coating solution preferably includes at least 0.005. 0.01, 0.02 or 0.1 wt % of the monomer comprising at least four amine-reactive moieties. A preferred range is from 0.005 to 0.02 wt %.

The non-polar solution may optionally include additional materials including co-solvents, phase transfer agents, solubilizing agents and complexing agents wherein individual additives may serve multiple functions. Representative co-solvents include: benzene, toluene, xylene, mesitylene, ethyl benzene diethylene glycol dimethyl ether, cyclohexanone, ethyl acetate, butyl Carbitol™ acetate, methyl laurate and acetone. U.S. Pat. No. 6,878,278, U.S. Pat. No. 6,723,241, U.S. Pat. No. 6,562,266 and U.S. Pat. No. 6,337,018 describe the addition of a broad range of representative complexing agents that may combined with the non-polar solution prior to conducting the interfacial polymerization. A class of such complexing agents is represented by Formula (III):

where α is a non-sulfur containing binding core selected from elements falling within: (a) Group IIIA-VIB (i.e., Groups IIIA, IVA, VA, VIA, VIIA, VIIIA, IB, IIB, IIIB, IVB, VB, VIB) and (b) Periods 3-6 (i.e., Periods starting with Na, K, Rb, and Cs) of the conventional IUPAC periodic table. Groups IIIA through VIB of the conventional IUPAC form of the Periodic Table corresponds to: Groups 3-16 of the "new notation" IUPAC Periodic Table and Groups IIIB-VIA of the CAS version of the Periodic Table. In order to avoid any confusion further reference herein will utilize the conventional IUPAC Periodic Table, i.e., Group IIIA corresponds to the column starting with Sc, Y, La, etc, and Group VIB corresponds to the column starting with O, S, Se, Te, Po. Specific examples include: (1) the following metals: aluminum, scandium, titanium, vanadium, chromium, manganese, iron, cobalt, nickel, copper, zinc, gallium, germanium, arsenic, yttrium, zirconium, niobium, molybdenum, technetium, ruthenium, rhodium, palladium, silver, cadmium, indium, tin, antimony, tellurium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth (bismuth is not typically preferred), and polonium; (2) the following semi-conductors: silicon, selenium, and germanium and (3) phosphorous. Particularly preferred binding cores include: Al, Si, P, As, Sb, Se and Te and metals such as: Fe, Cr, Co, Ni, Cu, and Zn. L is an optional chemical linking group, the same or different, selected from linkages such as: carbon containing moieties, e.g., aromatic groups, alkanes, alkenes, —O—, —S—, —N—, —H—, —P—, —O—P—, and —O—P—O—, (each of which may be substituted or unsubstituted). β is solubilizing group, the same or different, and includes from 1 to 12 carbon atoms which may be substituted or unsubstituted and which may include internal linking groups as defined by L. Examples include aliphatic and arene groups having 1 to 6 carbon atoms, aromatic groups, heterocyclic groups, and alkyl groups. "x" is an integer from 0 to 1 and "y" is an integer from 1 to 5, preferably from 2 to 4. Although dependent upon the specific solvent(s) and acyl halide species utilized, the following complexing agents are generally useful in the subject invention: tri-phenyl derivatives of phosphorous (e.g., phosphine, phosphate), bismuth, arsenic and antimony; alkane oxy esters of phosphorous including tributyl and dibutyl phosphite; organo-metallic complexes such as ferrocene and tetraethyl lead and acetylacetonate complexes of iron (II), iron (III), cobalt (III) and Cr (III). A preferred class of such complexing agents is represented by Formula (IV).

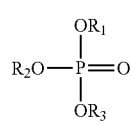

Formula (IV)

wherein "P" is phosphorous, "O" is oxygen and $R_1$, $R_2$ and $R_3$ are independently selected from carbon containing moieties. The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc., which may be unsubstituted or substituted (e.g., substituted with amide groups, ether groups, ester groups, sulfone groups, carbonyl groups, anhydrides, cyanide, nitrile, isocyanate, urethane, beta-hydroxy ester, double and triple bonds etc.), and cyclic groups, e.g., cyclo pentyl, cyclo hexyl, aromatics, e.g., phenyl, heterocyclic (e.g., pyridine), etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic linking group, e.g., methyl, ethyl, etc. Preferred carbon containing moieties include unsubstituted, branched or unbranched $C_1$-$C_{12}$ groups, and more preferably $C_1$-$C_8$ aliphatic groups such as: methyl, ethyl, propyl, isopropyl, butyl, 2-methyl butyl, 3-methyl butyl, 2-ethyl butyl, pentyl, hexyl, etc. Additionally, moieties include phenyl groups. When used, the aforementioned complexing agents are preferably used within the coating solution concentrations from about 0.001 to 2% w/w.

TFC membranes made according the present method preferable have NaCl Rejections greater than 95, 98, 99, and even 99.5% when tested using a 2000 ppm NaCl aqueous solution at 225 psi, 25° C. and pH 8. In other embodiments, TFC membranes made according to the present invention have flux values greater than 18, 22, or even 25 GFD when tested under the same conditions. In yet another set of embodiments, TFC membranes possess every combination of the aforementioned Rejection and Flux values, e.g. rejection greater than 99.5% and flux greater than: 18, 22, and even 25 GFD.

As a result of the subject method, a thin film polyamide layer can be made with increased carboxylic acid content as compared with that described in the literature. In a preferred embodiment, the thin film polyamide layer is characterized by having a dissociated carboxylate content of at least 0.16, 0.30, 0.45, 0.50, 0.55 moles/kg and preferably at least 0.6 moles/kg of polyamide. The "dissociated carboxylate content" of the polyamide layer can be determined by silver titration and a Rutherford Backscattering measurement according to the following methodology:

(i) Samples membranes (1 inch×6 inch) are boiled for 30 minutes in deionized water (800 mL), then placed in a 50/50 w/w solution of methanol and water (800 mL) to soak overnight. Next, 1 inch×1 inch size sample of the membranes are immersed in a 20 mL $1\times10^{-4}$ M $AgNO_3$ solution with pH adjusted to 9.5 for 30 minutes. Vessels containing silver ions are wrapped in tape and to limit light exposure. After soaking with the silver ion solution, the unbound silver is removed by soaking the membranes in 2 clean 20 mL aliquots of dry methanol for 5 minutes each. Finally, the membranes are allowed to dry in a nitrogen atmosphere for a minimum of 30 minutes.

(ii) Rutherford Backscattering (RBS) Measurement: Membrane samples are mounted on a thermally and electrically conductive double sided tape, which was in turn mounted to a silicon wafer acting as a heat sink. The tape used is Chromerics Thermattach T410 or a 3M copper tape. RBS measurements are obtained with a Van de Graff accelerator (High Voltage Engineering Corp., Burlington, Mass.); A 2 MeV $He^+$ room temperature beam with a diameter of 3 mm is used at an incident angle of 22.5°, exit angle of 52.5°, scattering angle of 150°, and 40 nanoamps (nAmps) beam current. Membrane samples are mounted onto a movable sample stage which is continually moved during measurements. This movement allows ion fluence to remain under $3\times10^{14}$ $He^+/cm^2$.

(iii) Data Analysis: Analysis of the spectra obtained from RBS is carried out using SIMNRA®, a commercially available simulation program. A description of its use to derive the elemental composition from RBS analysis of RO/NF membranes is described by Coronell, O. et. al., in *J. of Membrane Sci.* 2006, 282, 71-81 and in *Environmental Science & Technology* 2008, 42(14), 5260-5266. The SIMNRA® simulation program may be used to fit a two layer (a thick polysulfone layer beneath a thin polyamide layer) or a three layer system (e.g., polysulfone, polyamide, and surface coating). The atom fraction composition of the two layers (polysulfone before adding the polyamide layer, and the surface of final TFC polyamide layer) is measured first by XPS to provide bounds to the fit values. As XPS cannot measure hydrogen, an H/C ratio from the proposed molecular formulas of the polymers can be used, 0.667 for polysulfone and a range of 0.60-0.67 was used for polyamide. Although the polyamides titrated with silver nitrate only introduces a small amount of silver, the scattering cross section for silver is substantially higher than the other low atomic number elements (C, H, N, O, S) and the size of the peak is disproportionately large to the others despite being present at much lower concentration thus providing good sensitivity. The concentration of silver is determined using the two layer modeling approach in SIMNRA® by fixing the composition of the polysulfone and fitting the silver peak while maintaining a narrow window of composition for the polyamide layer (layer 2, ranges predetermined using XPS). From the simulation, a molar concentration for the elements in the polyamide layer (carbon, hydrogen, nitrogen, oxygen and silver) is determined. The silver concentration is a direct reflection of the carboxylate molar concentration available for binding silver at the pH of the testing conditions.

While not used in the present experiments, the carboxylic acid content of TFC polyamide membranes (moles/kg of polyamide) can also be determined using the measured polyamide mass per unit area and the moles of carboxylic acids groups per unit area, such as by complexation and quantification methods described below.

The moles of carboxylic acids groups per unit area of membrane is indicative of the number of interactions seen by a species passing through the membrane, and a larger number will thus favorably impact salt passage. This value may be calculated by multiplying the measured carboxylate content by a measured thickness and by the polyamide density. Alternatively, the carboxylate number per unit area of membrane (moles/m2) may be determined more directly by methods that measure the total complexed metal within a known area. Approaches using both Uranyl acetate and toluidine blue O dye are described in: Tiraferri, et. al., *Journal of Membrane Science*, 2012, 389, 499-508. An approach to determine the complexed cation (sodium or potassium) content in membranes by polymer ashing is described in (Wei Xie, et al., *Polymer*, Volume 53, Issue 7, 22 Mar. 2012, Pages 1581-1592).

A preferred method to determine the dissocated carboxylate number at pH 9.5 per unit area of membrane for a thin film polyamide membrane is as follows. A membrane sample is boiled for 30 minutes in deionized water, then placed in a 50 wt % solution of methanol in water to soak overnight. Next, the membrane sample is immersed in a $1 \times 10^{-4}$ M $AgNO_3$ solution with pH adjusted to 9.5 with NaOH for 30 minutes. After soaking in the silver ion solution, the unbound silver is removed by soaking the membranes twice in dry methanol for 30 minutes. The amount of silver per unit area is preferably determined by ashing, as described by Wei, and redissolving for measurement by ICP. Preferably, the dissocated carboxylate number at pH 9.5 per square meter of membrane is greater than $6 \times 10^{-5}$, $8 \times 10^{-5}$, $1 \times 10^{-4}$, $1.2 \times 10^{-4}$, $1.5 \times 10^{-4}$, $2 \times 10^{-4}$, or even $3 \times 10^{-4}$ moles/m$^2$.

EXAMPLES

All the TFC membranes described below were made using polysulfone porous supports produced using a pilot scale manufacturing facility. The polysulfone supports were cut into pieces, attached to wire frames and dipped in water for approximately 30 minutes. The supports were then removed and immersed in an aqueous coating solution including 4.5 wt % triethylammonium camphorsulfonate, 0.06 wt % sodium lauryl sulphate and 4 wt % mPD solution for approximately 20 minutes. The support was then placed on a paper towel on top of a plastic sheet and excess solution was nipped off with a roller. A gasket and a plastic sheet were placed on the support and clamped on four sides to make a leak proof seal at the edges. The supports were then coated with a non-polar solution comprising Isopar L, 4 wt % mesitylene, and trimesoyl chloride ("TMC"), and various amounts of mhTMC and 5,5'-methylene isophthaloyl dichloride ("Tetra") or various amounts of mh TMC and benzene-1,2,4,5-tetracarbonyl tetrachloride as indicated below in Table I or Table II; however, in each example the total concentration of TMC and Tetra or benzene-1,2,4,5-tetracarbonyl tetrachloride (benzene tetra acid chloride) was kept constant at 0.3 wt %. Residual coating solution was then poured off and the membrane was rinsed with 80 mL hexane, air-dried for approximately a minute and stored in RO water before testing. From each membrane, 2 coupons were cut and tested in a flat cell bench test bench at room temperature using a 2000 ppm NaCl aqueous solution at 225 psi, 25° C. and pH 8. Flux and NaCl rejection were measured and the results are summarized in Tables I and Table II.

TABLE I

| Sample No. | MhTMC (% w/w) | "Tetra" (% w/w) | Flux (GFD) (standard deviation) | NaCl Rejection (%) (standard deviation) |
|---|---|---|---|---|
| 1 | 0 | 0 | 16.9 (1.65) | 99.53 (0.08) |
| 2 | 0.01 | 0 | 14.0 (1.48) | 99.60 (0.02) |
| 3 | 0.02 | 0 | 15.2 | 99.53 |
| 4 | 0.025 | 0 | 19.5 (2.58) | 99.51 (0.15) |
| 5 | 0.04 | 0 | 22.1 (2.36) | 99.23 (0.18) |
| 6 | 0.01 | 0.013 | 18.2 (1.08) | 99.67 (0.02) |
| 7 | 0.02 | 0.013 | 18.6 | 99.62 |
| 8 | 0.025 | 0.013 | 22.5 (0.72) | 99.63 (0.08) |
| 9 | 0.04 | 0.013 | 25.1 (0.88) | 99.47 (0.08) |

TABLE II

| Sample No. | MhTMC (% w/w) | "Benzene Tetra acid chloride" (% w/w) | Flux (GFD) (standard deviation) | NaCl Rejection (%) (standard deviation) |
|---|---|---|---|---|
| 1 | 0.04 | 0 | 22.1 (2.36) | 99.23 (0.18) |
| 2 | 0.04 | 0.066 | 26.7 | 99.40% |
| 3 | 0.01 | 0 | 14.0 (1.48) | 99.60 (0.02) |
| 4 | 0.01 | 0.013 | 17.3 | 99.71% |

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. The entire subject matter of each of the aforementioned US patent documents is incorporated herein by reference.

The invention claimed is:

1. A method for making a composite polyamide membrane comprising a porous support and a thin film polyamide layer, wherein the method comprises the steps of applying a polyfunctional amine monomer and a combination of amine-reactive compounds to a surface of the porous support and interfacially reacting the constituents to form a thin film polyamide layer, wherein the amine-reactive compounds are coated from one or more non-polar coating solutions and comprise:
   i) a polyfunctional amine-reactive monomer comprising two to three amine-reactive moieties selected from acyl halide, sulfonyl halide and anhydride,
   ii) a polyfunctional amine-reactive monomer comprising at least four amine-reactive moieties selected from acyl halide, sulfonyl halide and anhydride, and
   iii) an acid compound comprising at least one carboxylic acid moiety or salt thereof and at least one amine-reactive moiety selected from acyl halide and sulfonyl halide; and
   wherein the acid compound comprises at least 0.025 wt % of the total coating solution used to apply said amine-reactive compounds;
   wherein the polyfunctional amine monomer is aromatic and comprises at least two primary amino groups and is applied from a polar coating solution; and
   wherein the composite polyamide membrane has a NaCl rejection greater than 99.6% when tested using a 2000 ppm NaCl aqueous solution at 225 psi, 25° C. and pH 8.

2. The method of claim 1 wherein the thin film polyamide layer is characterized by having a dissociated carboxylate content at pH 9.5 of at least 0.16 moles/kg.

3. The method of claim 1 wherein the composite polyamide membrane a flux greater than 22 GFD when tested using a 2000 ppm NaCl aqueous solution at 225 psi, 25° C. and pH 8.

4. The method of claim 1 wherein the polyfunctional amine-reactive monomer comprising at least four amine-reactive moieties is represented by Formula (I):

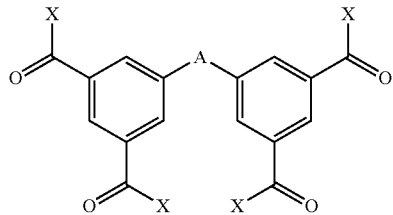

wherein A is selected from: oxygen (—O—), carbon (—C—), silicon (—Si—), each of which may be unsubstituted or substituted with alkyl group having from 1 to 4 carbon atoms; or a carbonyl group (—C(O)—), and each X is the same or different and is selected from a halogen.

5. The method of claim 1 wherein the polyfunctional amine-reactive monomer including two to three amine-reactive moieties comprises: trimesoyl chloride.

6. The method of claim 1 wherein the acid compound comprises: mono-hydrolyzed trimesoyl chloride.

7. The method of claim 1 wherein the polyfunctional amine-reactive monomers are coated upon the porous support from a common non-polar solution.

* * * * *